Sept. 28, 1926.

B. ROLLMAN

MANURE SPREADER

Filed August 13, 1925   7 Sheets-Sheet 5

INVENTOR.
BRUCE ROLLMAN,

ATTORNEYS

Sept. 28, 1926.  
B. ROLLMAN  
MANURE SPREADER  
Filed August 13, 1925  7 Sheets-Sheet 7

1,601,480

INVENTOR  
BRUCE ROLLMAN,  
ATTORNEYS

Patented Sept. 28, 1926.

1,601,480

UNITED STATES PATENT OFFICE.

BRUCE ROLLMAN, OF BELLEVUE, OHIO, ASSIGNOR TO THE OHIO CULTIVATOR COMPANY, OF BELLEVUE, OHIO, A CORPORATION OF OHIO.

MANURE SPREADER.

Application filed August 13, 1925. Serial No. 49,871.

This invention relates to improvements in manure spreaders, designed for use in agricultural pursuits.

The principal features of the invention are the following:—

(1) The application of the draft strains, not directly to the axle, but directly to the wheel knuckles, so that whenever a front wheel is obstructed, as by striking an obstruction or dropping into a depression, the tendency of the pole to be whipped to one side, or the axle to jerk back, is eliminated, since the draft strains are thus applied directly to the front wheels.

This whipping action of the pole and axle heretofore experienced has been due to the fact that the draft strains were applied directly to the axle, usually at or near the middle thereof, so that when either front wheel was obstructed the axle jerked back and the pole whipped to one side. But, with this invention, if either wheel meets an obstruction, the whipping of the pole to one side and the jerking of the axle are overcome by this direct application of the draft strains to the wheels.

(2) The positioning of the wheel spindles in the same horizontal plane with the draft arms that extend from the knuckles so that the draft strains applied to the arms are in line with the wheel spindles to prevent any unequal drag being exerted on the upper and lower portions of the knuckle-pivots.

(3) The application of the draft strains through the draft arms and the knuckles to the outer ends of the front axle, whereby the axle is in effect pulled from both ends while its middle portion is connected with the reach-bar so as to pull on the rear axle. It is thought to be new to apply the draft strains to the ends of the axle and the drag strains of the reach pole to the middle of the axle.

(4) The provision of a sliding draft-head on the pole and the connection of this draft-head to the whiffletree and with the wheel knuckles so that the pole does not perform any of the pulling functions but is merely a guiding instrumentality to enable the horses to properly direct the course of the machine while the draft-head receives all of the pulling strains from the traces.

(5) The making of the body-bolster ride on the upper face of the axle when the axle is horizontal or raised up at one end as compared with the other end; the king bolt hole being large enough as compared with the size of the king bolt to permit either end of the axle to be raised up. This results in maintaining the forward end of the body horizontal no matter whether the front axle is raised at one end or not. The horizontal position of the front end of the body is maintained by this construction.

(6) The forming of the knuckle of a central member from which the spindle and draft arm extend, and combining it with an upper and lower disc which latter discs are thinner at one side than at the other, whereby though the outer faces of these discs may be horizontal, the spindle will be dipped down slightly, so as to make the front wheels gather, that is to say, make the lower portions of the front wheels closer together than their upper portions. This construction results also in maintaining this gather of the wheels no matter whether the wheel spindles are in line with the axle or are adjusted forwardly or rearwardly relative to the axle, as in making turns. In other words, in any position of the spindles the wheels maintain their gather because of this construction of the knuckles.

(7) The provision of a truss-rod extending from one end to the other of the bolster to prevent the ends of the bolster from spreading apart under the weight of the body and its contents.

In the accompanying drawings, forming a part of this specification.

In the accompanying drawings the numeral 1 designates the body of a manure spreader having the usual or any approved type of delivery drum 2, and a bladed spreader device 3, whereby the contents of the body are delivered from its rear end and distributed or spread over the ground by the action of these parts, which are driven in any suitable manner as generally indicated at 4 in the drawings but which parts are not concerned with the present invention. A lever and intermediate devices indicated generally at 5 and 6 are employed to throw the power on and off of the operating devices. This body is supported at its rear end on a rear axle 7 carried by ground wheels 8 and carrying a sprocket or gear 9. And these features also have no reference to the present invention, but are conventional.

Figures 1, 2:
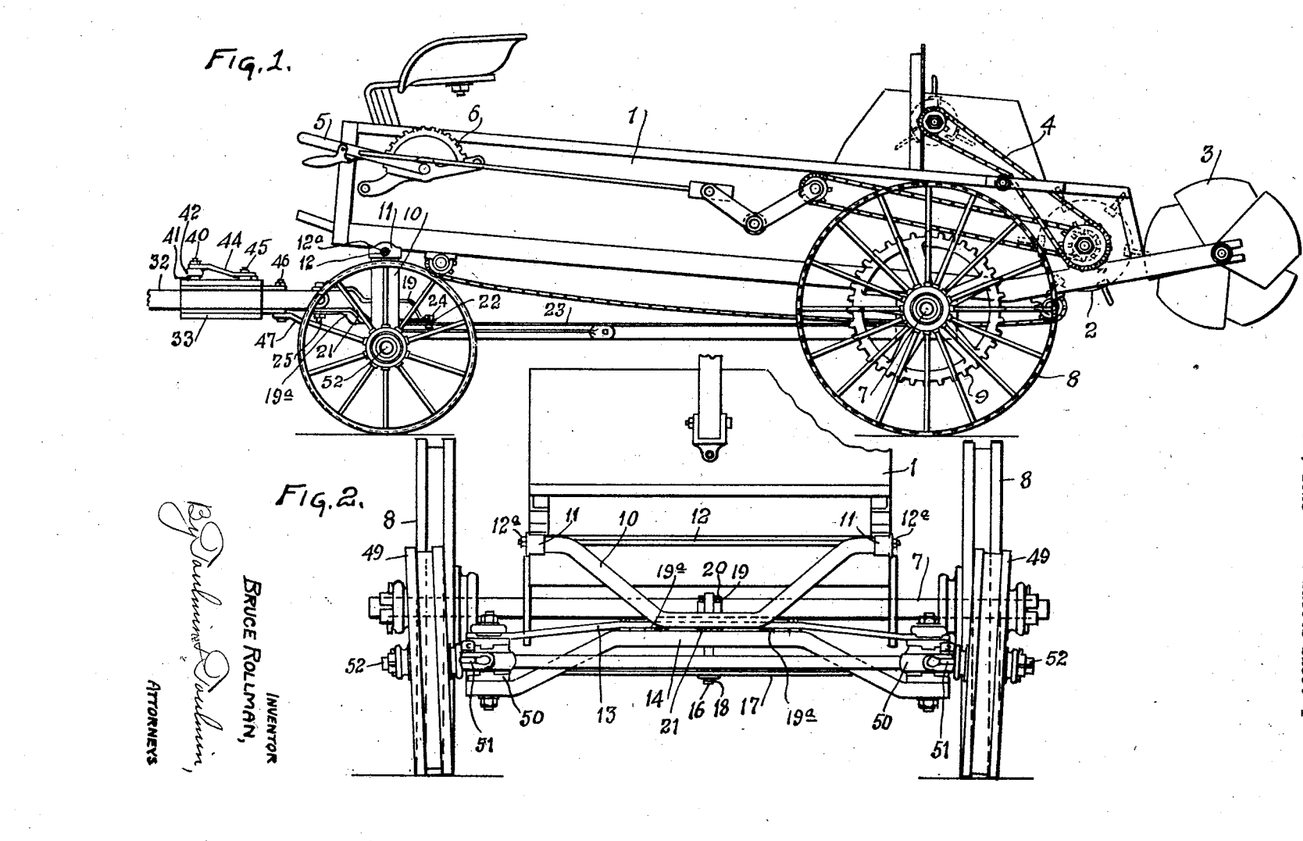
Fig. 1 is a side elevation of a spreader embodying my improvements.
Fig. 2 is a front elevation of the machine, with the pole and draft rods removed.
Figure 3:
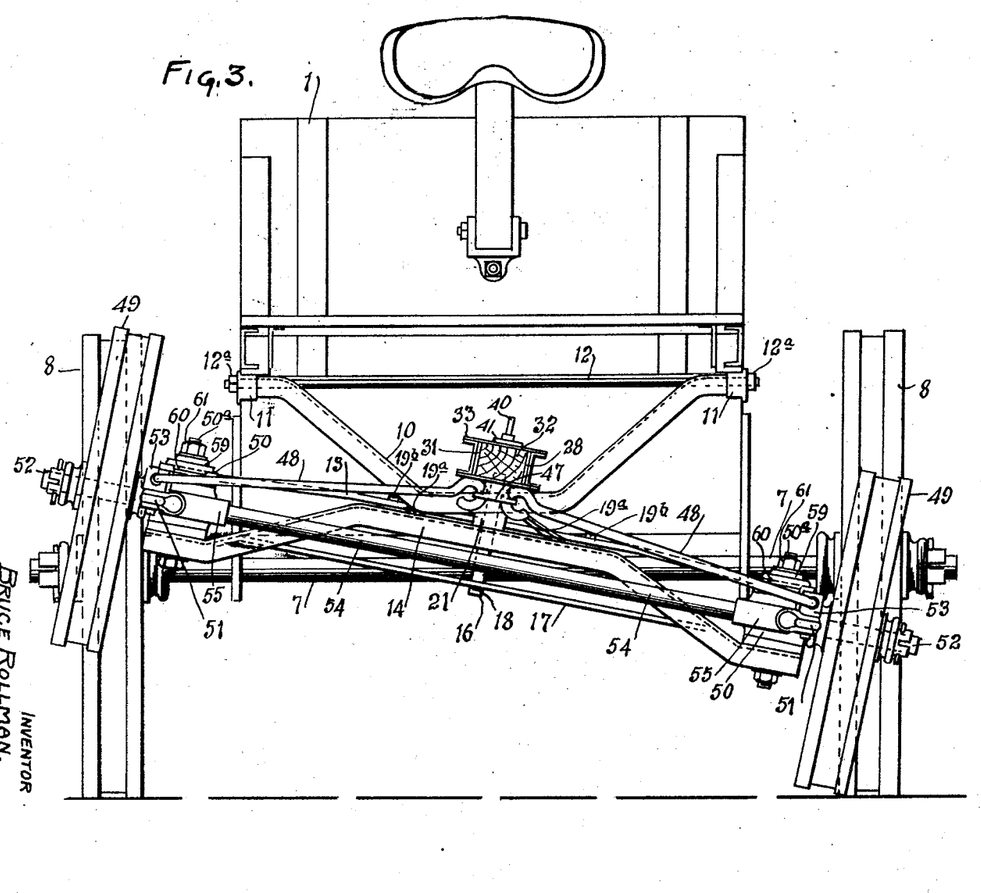
Fig. 3 is another front elevation, on a larger scale, with one end of the front axle raised up, as when going over a severe obstruction.

The forward end of the body is supported upon a bolster 10 as best seen in Figs. 2 and 3. This bolster in cross section is in the nature of a channel iron as shown clearly in Fig. 8. The upper extremities of the bolster are attached to the body by means of brackets 11 secured to the body structure and receiving the ends of the bolster. A truss-rod 12 extends beneath the body and through the brackets 11 and is provided with nuts 12ª which screw thereon, whereby tension is put upon the rod to hold the brackets and the bolster from spreading laterally.

Figure 8:
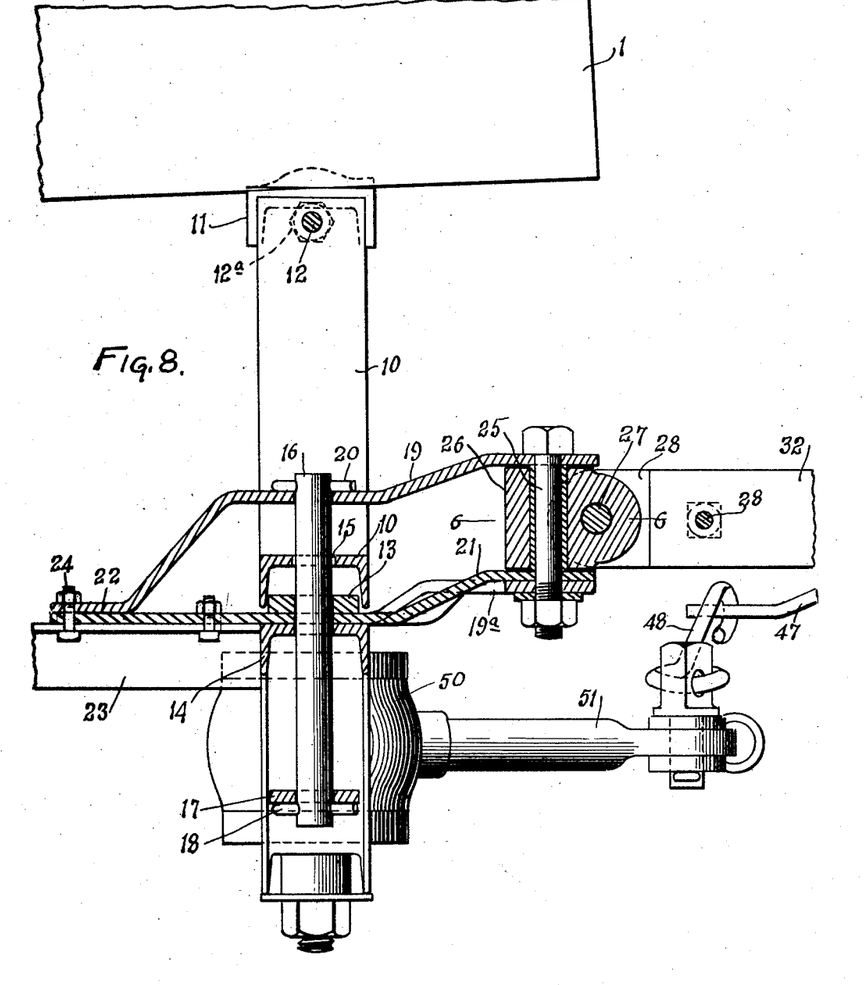
Fig. 8 is a vertical sectional view of the pole connection with the axle, showing one of the knuckles and draft arms in elevation, as also the king bolt and a part of the front bolster, such section being taken on the line 8—8 of Fig. 7.
Figures 9, 10, 11, 12:
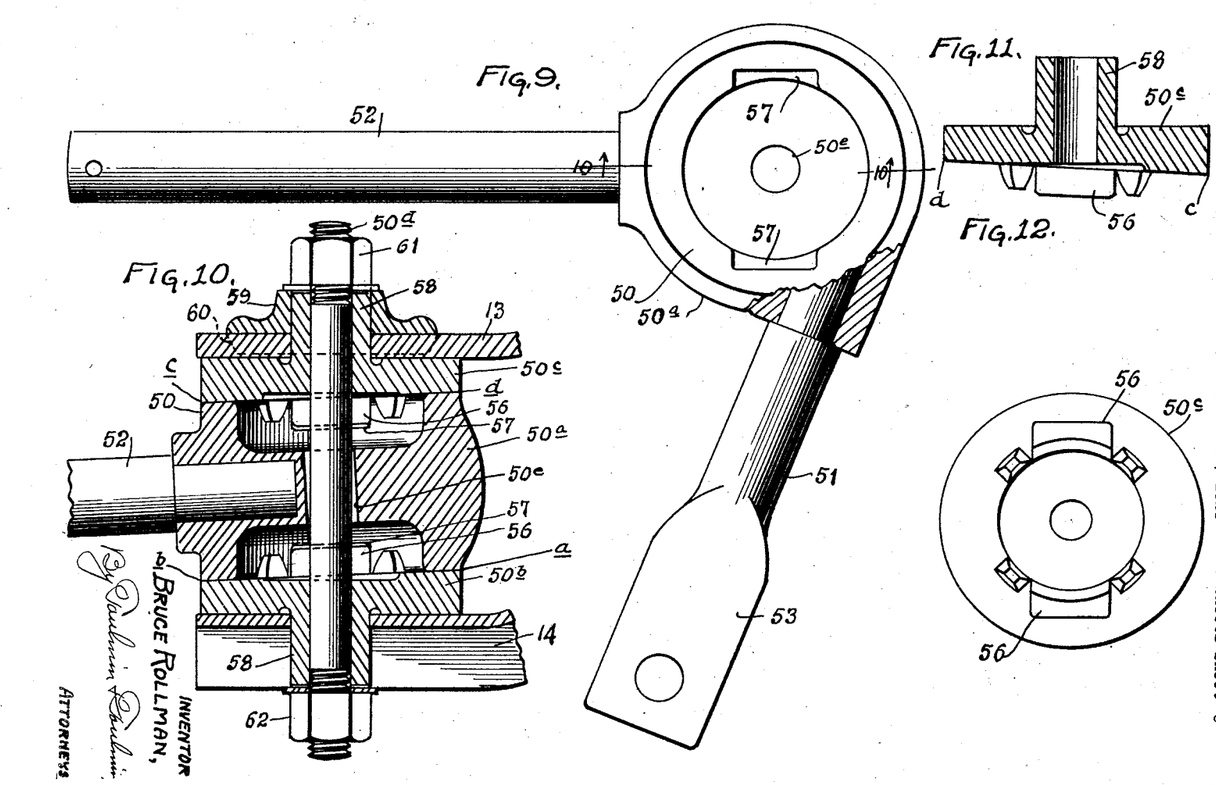
Fig. 9 is an enlarged plan view of one of the knuckles with its wheel spindle and draft arm.
Fig. 10 is a vertical sectional view of the same parts taken on the line 10—10 of Fig. 9.
Fig. 11 is a detail vertical sectional view through the upper disc of the knuckle.
Fig. 12 is an inverted plan view of such disc.

The under face of the bolster being of channel formation as shown in Fig. 8 enables the bolster to overlap the upper bar 13 of the axle and to ride upon the upper surface of the axle arch 14, that is to say, on the middle elevated portion thereof, whereby when the axle is raised at either end the engagement or interlocked relation of the bolster and axle will be maintained substantially to the same extent as if the axle continued in a horizontal position. This permits the body of the machine to maintain a horizontal position, from side to side, irrespective of the non-horizontal position of the front axle, so that the body is not distorted or twisted by these up and down movements of the front axle.

Figures 4, 5, 6:
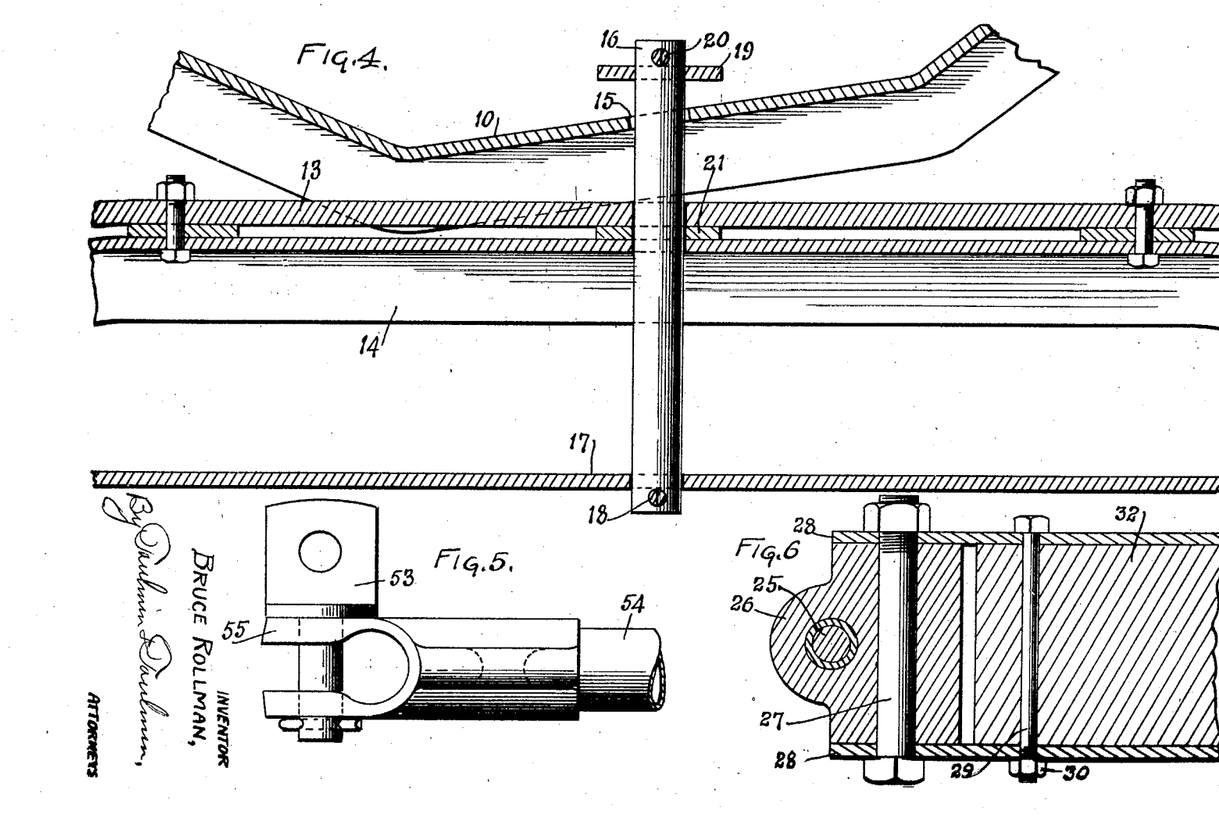
Fig. 4 is an enlarged detail view, in vertical section, of the front body-bolster and the front axle structure.
Fig. 5 is an enlarged detail view of one of the draft arms, its swivelled bolt and a part of the tie-rod.
Fig. 6 is a sectional view taken on the line 6—6 of Fig. 8, showing the guiding-pole coupling head.
Figure 15:
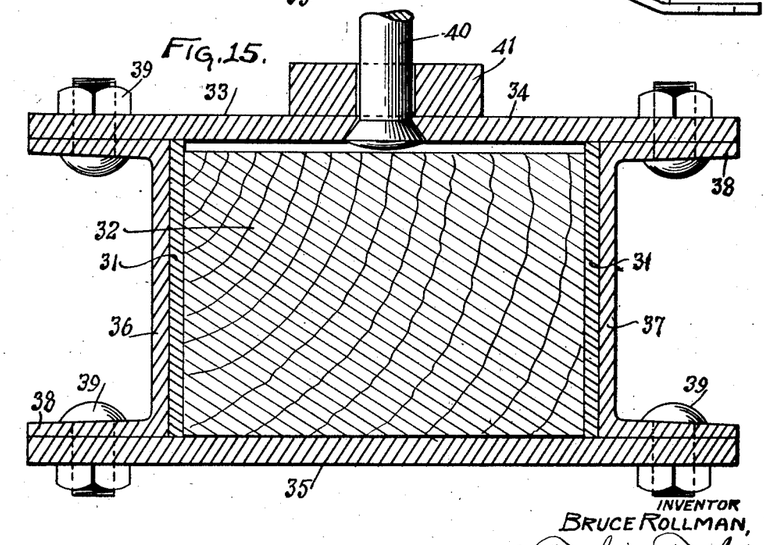
Fig. 15 is an enlarged transverse sectional view of the pole and the draft-head with the rub-plates, showing also the whiffletree bolt.

In order to accommodate these relative movements of the axle and bolster, the opening 15 in the bolster 10 for the passage of the king bolt 16 is large enough to permit the bolt to incline from side to side, according to which end of the axle is raised, without bending or binding in relation with the bolster. The features here described are clearly shown in Figs. 3, 4 and 8 in particular. The king bolt passes through the arch portion of the part 14 of the axle and thence at its lower end extends through the truss member 17 of the axle where it is held by a cotter pin 18, and at its upper end passes through the upper connecting strap 19 where again it is held by a cotter pin 20. A companion connecting strap 21 also receives the king bolt, all as clearly shown in Fig. 8. These connecting straps come together at 22 and are bolted to one another and to the reach pole 23 (which extends thence to the rear axle to which it is connected in any convenient manner), nuts and bolts 24 being used for this purpose. These connecting straps extend forward of the axle and carry a coupling bolt 25 which passes through a coupling head 26. This head in turn is coupled to the tongue or pole by means of a horizontal bolt 27 which extends laterally through plates 28 that are secured to the sides of the pole, as seen in Figs. 6 and 8, by means of bolts 29, having nuts 30. These plates at their forward portions constitute rub-plates 31, which intervene between the pole 32 and the draft-head, generally indicated at 33, and best seen in Figs. 7 and 15. This head is slidably mounted on the pole so that the draft strains which are applied to the head, as presently to be explained, are not transferred to the pole. This head is composed of upper and lower plates 34 and 35 and side plates 36 and 37 as also seen in Fig 15 particularly. The plates 36 and 37 contact with the rub-plates 31 and have flanges 38 by which they are secured to the upper plate 34 and the lower plate 35 through bolts and nuts indicated at 39. This draft-head carries a whiffletree bolt 40 which preferably has its lower end counter sunk into the upper plate 34 and passes through a boss 41 to stiffen the bolt's connection with the head. This bolt 40 receives a conventional whiffletree 42 having the usual single trees 43 to which the trace chains of the harness of the draft horses are connected. A brace 44 fits over the bolt 40 and is secured to the draft-head by bolt and nut 45 to strengthen the connection between the head and the whiffletree bolt. It will now be understood that when the draft strains are applied they are exerted on the draft-head which is capable of a sliding movement on the pole, so that the pole performs merely the office of enabling the draft horses to direct the machine through the usual connection of the pole with the hames.

I have before stated that the front axle structure is connected to the pole through the connecting straps 19 and 21. In order to brace these straps laterally, I further provide braces 19ª, seen in Fig. 7, through which the coupling bolt 25 passes, as seen in Fig. 8. These braces are secured to the arch bar 13 of the front axle as shown at 19ᵇ in Fig. 7.

Figure 7:
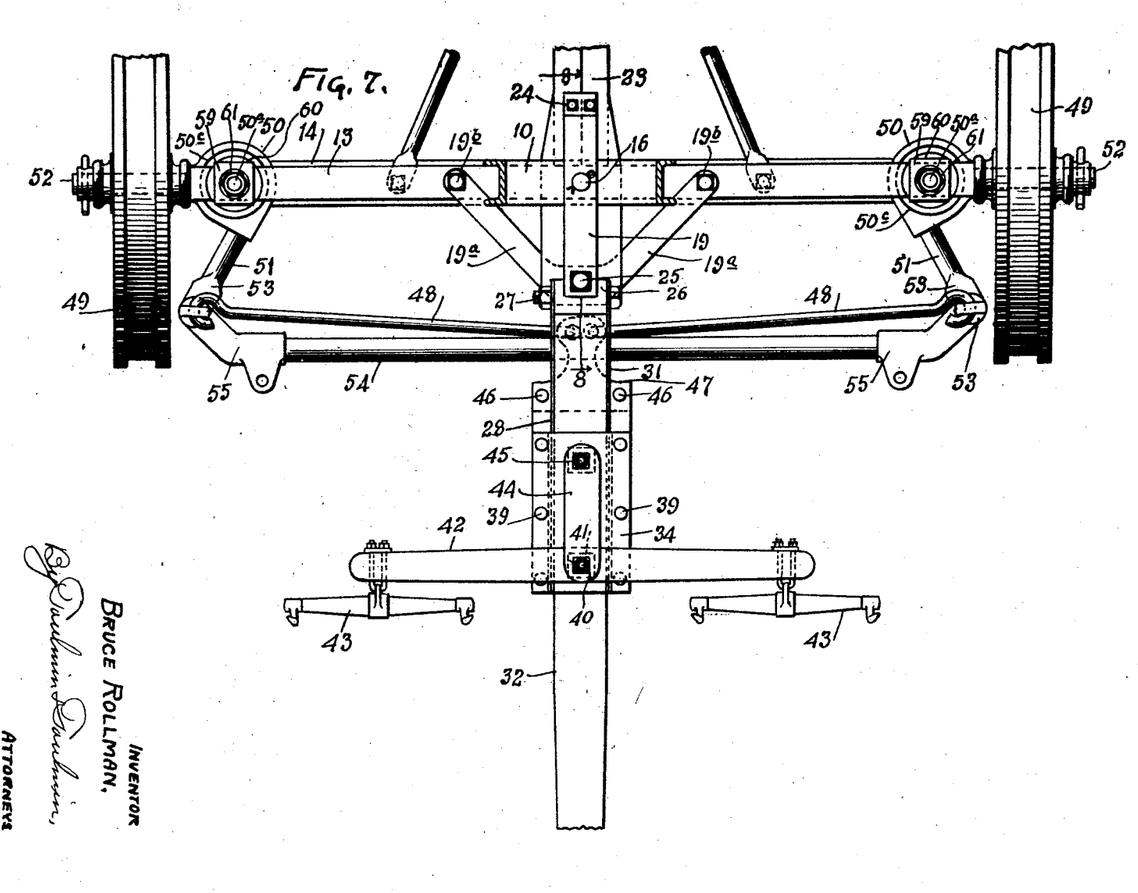
Fig. 7 is a plan view of the front axle with its several attachments and the guiding-pole with its attachments, and showing particularly the draft devices.
Figure 13:
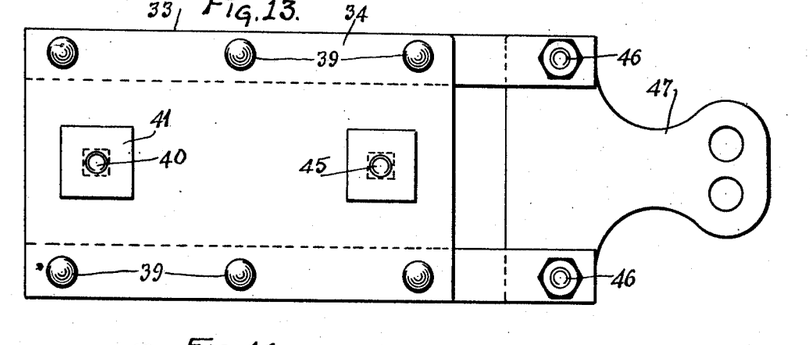
Fig. 13 is an enlarged plan view of the draft plate and the upper draft-head plate, with that portion of the draft-pole on which these parts are mounted.
Figure 14:
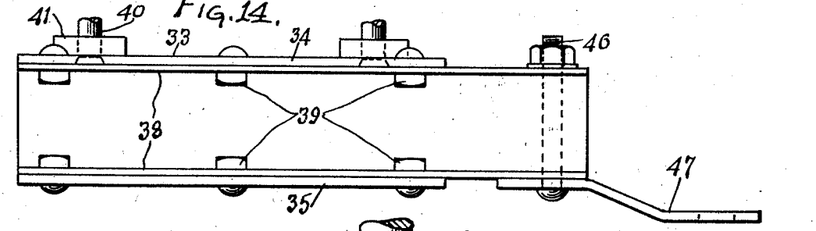
Fig. 14 is a side elevation of the same parts, showing also one of the side plates of the draft-head.

Referring now to the means of transmitting the draft strains from the draft-head to the wheel knuckles, attention is directed particularly to Figs. 7, 8, 10, 13 and 14. Secured to the draft-head as by bolts 46, or forming a part of the head, is an extension in the nature of a plate 47, as seen in Figs. 7, 13 and 14. To this extension are connected draft rods 48, more particularly shown in Fig. 7. These rods are further connected with the front wheels 49 through the knuckles generally indicated at 50 and having arms 51 and spindles 52. The arms 51 carry swivelled bolts 53 to which the draft rods 48 are directly connected. The draft arms 51 are interconnected by a tie-rod 54 preferably in the nature of a pipe, and having coupling brackets 55 on the ends thereof which are bifurcated to receive the ends of the draft arms 51, as seen in Figs. 5 and 8.

Thus, it will be seen that when the draft strains are applied to the draft-head, they are transmitted thence through the draft rods 48, draft arms 51, the knuckles 50 and spindles 52 to the front wheels, and from the knuckles also to the ends of the front axle. The effect of this application of the draft strains to the front wheels subjects these wheels to such perfect control, and locates the draft strains so near obstructions with which the wheels meet, that the wheels are prevented from jerking backward when they meet the obstructions, and the pole is also prevented from being whipped to one side to the danger or discomfort of the draft horses, and it will be noted also that these draft strains reach the front axle at the outer ends thereof, not being applied to the axle at or near the center or middle portion thereof as heretofore. Moreover, this application of the draft strains to the front wheels results in making them overcome obstructions through the force of the draft strains themselves, in a direct manner, instead of being dragged over the obstructions in an indirect and impositive way by a mere pull, as heretofore, on the axle at points remote from the ends thereof, which latter condition has heretofore permitted the front wheels, when obstructed, to drag back and finally pass over the obstruction with a jerk.

As the draft rods 48 tend to draw the draft arms toward each other, the tie-rod 54 operates to keep them properly spread apart in the manner indicated in Fig. 7, so that when the draft horses move forward and throw the pull on the draft-head and thence on the draft rods 48, the machine moves forward in a steady and direct line according to the course taken by the horses.

I will now refer to the construction of the knuckles 50. Each of them consists of a hub-like member 50ª, a lower disc 50ᵇ, and and upper disc 50ᶜ. These discs are interlocked with the hub by means of the projections 56 which extend into recesses 57 in the hub, all as clearly shown in Fig. 10. Each disc has a sleeve 58 to form with the disc an elongated bearing for the pivot bolt 50ᵈ as also to form projections or bearings which extend through the brace bar 13 and the arch bar 14 which constitute the front axle. The cap 59 has lugs 60 which embrace the edges of the brace bar 13. The cap is clamped down on the disc 50ᶜ by means of the nut 61 on the pivot bolt 50ᵈ, a similar nut 62 being threaded on the other end of the pivot bolt 50ᵈ to exert a pressure against the sleeve 58 of the lower disc 50ᵇ. In this way the parts of the knuckle structure are held together and a pivot bearing formed between the knuckle and the members which constitute the front axle. The hub has an opening 50ᵉ large enough to permit the hub being inclined more or less without binding on the pivot bolt 50ᵈ.

The draft arm 51 is suitably secured to the hub 50ª, preferably by being projected into the mould in which the hub is cast so that the hub will be formed or cast about and around the arm, and thus make the arm in effect integral with the hub. (See Fig. 9.) The same remarks apply to the wheel spindle 52. (See Fig. 10.) The draft arm and spindle are in the same general plane.

I will now refer to the features by which the inclined position of the wheel spindle is obtained in order to give the wheel its gather. It will be seen that the disc 50ᵇ inclines on its upper surface as shown from the point "a" to the point "b", and that the disc 50ᶜ reversely inclines from the point "c" to the point "d". The result is that two inclined surfaces are formed, one from "a" to "b" and the other from "c" to "d". The hub 50ª fits between these two inclined surfaces and is, therefore, tilted out of the vertical, which has the effect of inclining the wheel spindle to give the wheel its gather. And this gather of the wheel, and inclination of the spindle is preserved in the several positions to which the wheel may be deflected in the act of steering. This effect is caused by the rotating of the hub and with it the disc 50$^b$ and 50$^a$, whereby the inclination of the hub, and, therefore, of the spindle is preserved during the movement of the spindle in the arc of a circle incident to steering the machine.

It will now be seen that I have provided an efficient and easily manufactured means for mounting the knuckles in the front axle and of attaining and preserving the gather of the front wheels, not only when the machine is moving straight ahead, but also when it is being guided to either side.

It will further be noted that the draft arms and the wheel spindles are in substantially the same horizontal plane, so that the draft strains applied to the arms will be in line with the wheel spindles and thus prevent any unequal drag being exerted on the upper and lower portions of the knuckle pivots.

It will also be seen that by reason of the improvements set forth herein, I have produced a manure spreader of a highly efficient and useful character and have incorporated it in a practical and economical embodiment, which carries into effect the principal features of invention set forth in the opening portion of this specification.

Having thus fully described my invention, what I claim as new and desire to secure by Letters Patent, is:

1. In a manure spreader, the combination with a front axle adapted to be raised at either end, of a bolster secured to the body and having its under face channeled to receive the upper portion of the axle, such portion of the axle abutting the vertical portions of the channel walls, whereby the axle and bolster may change relative positions and still exert the draft strains on the axle against the bolster, and a king bolt loosely fitting the other parts, whereby the axle when raised at either end will maintain interlocked engagement with the bolster.

2. In a manure spreader, the combination with an axle composed of an arch bar and a brace bar, of a bolster secured to the body and composed of a channel iron with its middle portion substantially parallel with the middle portion of the axle and with the upper part of the axle within and fitting the channel of the bolster, whereby draft strains on the axle are applied to and against the bolster, and a king pin adapted to connect the bolster and axle and permit of either end of the axle being raised.

3. In a manure spreader, the combination with the body, of a bolster secured thereto and having its middle portion extended away from the body, and a truss rod connecting the ends of the bolster together and adapted to prevent the ends from spreading apart.

4. In a manure spreader, the combination with the body and the front axle, knuckles pivoted to the axle and wheels on spindles carried by the knuckles, of a pole a draft head slidably mounted thereon and adapted to receive the pull of the draft strains, and draft rods which connect the draft head to the knuckles, whereby the draft strains put the wheels under control to prevent the wheels from being deflected by obstructions and the axle from being jerked back.

5. In a manure spreader, the combination of a front axle, knuckles pivoted thereto each having a wheel spindle and a draft arm and wheels mounted on said spindles, of a guiding pole having connection with the axle, a draft head slidably mounted on said pole and draft rods which connect the draft head with the draft arms, for the purpose described.

6. In a manure spreader, the combination with a front axle having upper and lower separated members, knuckles pivoted to said members and located between them, each knuckle having a wheel spindle and a draft arm, and wheels on said spindles, of a guiding pole connected with the axle, a draft head of box-like formation slidably mounted on said head, and draft rods which connect the head and the draft arms, for the purpose described.

7. In a manure spreader, the combination with a front axle, knuckles pivoted thereto, wheels mounted on spindles carried by the knuckles and arms projecting from the knuckles, of a tie rod which connects the draft arms together, a draft head, and draft rods which connect the head and the draft arms.

8. In a manure spreader, the combination with a front axle, knuckles mounted therein, each knuckle having a spindle and a draft arm, and wheels mounted on said spindles, of a guiding pole secured to the axle, a slidable draft head mounted on said pole, draft rods which connect the head with the arms, and a tie rod which interconnects the two arms, whereby the arms maintain their proper relative position when the draft strains are applied to them through the draft rods.

9. In a manure spreader, the combination with a front axle, knuckles pivoted thereto, each knuckle having a spindle and a draft arm, and wheels mounted on said spindles, of a guiding pole connected to the axle, a draft head of box-like formation adapted to slide on the pole, rods which connect such head with the draft arms, and a tie rod which interconnects the two draft arms, whereby the machine may be guided by deflecting the wheels and whereby the draft strains may be applied to the wheels and the ends of the axle.

10. In a manure spreader, the combination with a pole, of a draft head slidably mounted thereon.

11. In a manure spreader, the combination with a guiding pole of a draft head slidably mounted thereon, a whiffletree connected to said head and single trees carried by the whiffletree, whereby draft strains may be exerted upon said head.

12. In a manure spreader, the combination with a guiding pole, of a slidable draft head comprised of upper and lower plates and side plates which embrace the pole, whereby the head may have a sliding movement on the pole.

13. In a manure spreader, the combination with a guiding pole, of a draft head comprised of an upper plate having a whiffletree bolt, and a whiffletree mounted on said bolt and carrying single trees, a lower plate, and flanged side plates bolted to the upper and lower plates.

14. In a manure spreader, the combination with a guiding pole having rub plates, of a draft head having side plates which contact with said rub plates, and having upper and lower plates which are secured to the side plates.

15. In a manure spreader, the combination with a front axle and its king pin, and draft straps connected therewith, of a guiding pole, a coupling head pivoted thereto and pivoted to the draft straps.

16. In a manure spreader, the combination with a guiding pole and a coupling head horizontally pivoted to the pole and having a vertical pivotal bolt, and draft devices mounted on said bolt.

17. In a manure spreader, the combination with an axle, of a knuckle pivotally mounted thereto, and comprising a hub having a wheel spindle, and other parts above and below the hub having inclined faces with which the hub contacts, whereby the wheel spindle is maintained in an inclined position during the normal and guiding positions of the hub to maintain the gather of the wheels.

18. In a manure spreader, the combination with an axle, of a knuckle pivoted thereto and composed of a hub having a wheel spindle and a draft arm, and upper and lower parts having inclined faces with which the hub contacts, whereby the wheel spindle is maintained in an inclined position when the draft arms are subjected to pulling and guiding strains, so that the wheel will maintain its gather under these conditions.

19. In a manure spreader, the combination with an axle, of a knuckle having a pivot bolt mounted in the axle and a wheel spindle, the knuckle comprising a hub and upper and lower disks each having an inclined face with which the hub ends contact to cause the spindle to maintain an inclined position.

20. In a manure spreader, the combination with an axle, of a knuckle having a pivot bolt mounted in the axle and composed of a central hub having a draft arm and a wheel spindle, an upper and a lower disk interlocked with the hub and each having an inclined face between which the hub is positioned, whereby its spindle is inclined to cause the wheel to gather.

21. In a manure spreader, the combination with an axle having upper and lower members, of a knuckle comprising an upper disk having a sleeve mounted in the axle and the lower inclined face, a lower disk having a sleeve mounted in the axle and having an upper inclined face, a hub fitted between said inclined faces and having a spindle which is thereby inclined, and a bolt extending through the disks and hub and having nuts to bind against the sleeves of the disks to maintain the disks in proper contact with the hub.

22. In a manure spreader, the combination with a front axle and a guiding pole connected thereto, of a draft head carried by the pole, knuckles mounted on the axle and each composed of a hub having an inclined wheel spindle and a draft arm, an upper disk with an inclined surface next to the hub and a lower disk with an inclined surface also next to the hub, a tie rod which interconnects the draft arms, and draft rods which connect those arms with the draft head.

23. In a manure spreader, a knuckle composed of a hub having a draft arm and an inclined spindle, and of upper and lower members having inclined faces against which the ends of the hub abut.

24. In a manure spreader, a knuckle composed of a hub having a draft arm and an inclined spindle, and of upper and lower disks having inclined faces against which the ends of the hub abut, projections which position the hub between the two disks, and a pivot bolt extending through the disks and the hub and having nuts adapted to bind against the disks.

25. In a manure spreader, a knuckle composed of a central hub having a spindle and a draft arm, a lower disk having an inclined face next to the hub, projections to position the disk with respect to the hub, and a sleeve, an upper disk having an inclined face adjacent to the hub, projections to position the disk with respect to the hub, and having a sleeve, a cap fitted over said sleeve, and a bolt extended through the hub and caps and having nuts adapted to bind against the ends of said sleeves.

26. In a manure spreader, the combination with a knuckle having a draft arm, of a bolt swiveled in the draft arm, a tie rod pivoted to the arm by means of such bolt, and the draft rod connected with the bolt.

27. In a manure spreader, a body, a front and rear axle, a reach bar connected to the rear axle, a king pin for the front axle, draft straps mounted on said pin and connected to the reach bar at the rear of the front axle, a guiding pole connected to the draft straps in front of the axle, a draft head mounted on said pole, knuckles mounted on the front axle and each having an inclined spindle and a draft arm, a tie rod interconnecting the draft arms, draft rods connecting the draft head to said arms, a bolster fitted to overlap the front axle and connected to the body.

28. In a manure spreader, the combination with the front and rear axles, and a reach bar interconnecting them, the connection of the bar to the front axle being near the middle portion, of a guiding pole a draft head slidably mounted on said pole and connections between such head and the outer ends of the front axle, whereby the front axle is pulled from both ends while its middle portion pulls on the rear axle.

29. In a manure spreader, the combination with a rear and a forward axle and a reach bar connecting the middle portion of the forward axle to the rear axle, of knuckles mounted at the ends of the front axle and having wheel spindles and draft arms, a guiding pole a draft head slidably mounted on said pole and draft rods connecting the head with the draft arms, whereby the pulling strains are applied at the ends of the front axle and the drag strains on that axle are applied near the middle thereof.

In testimony whereof, I affix my signature.

BRUCE ROLLMAN.